Feb. 16, 1926.
W. J. GAMBLE
1,572,916
RADIATOR OR THE LIKE
Filed August 11, 1923    2 Sheets-Sheet 1
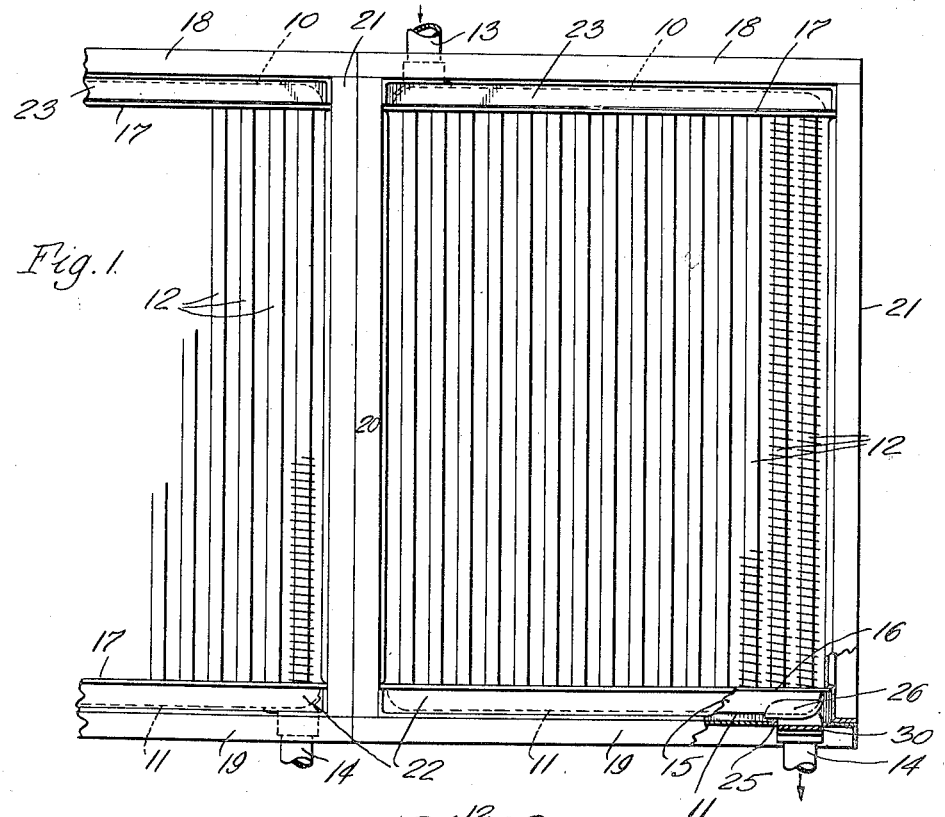
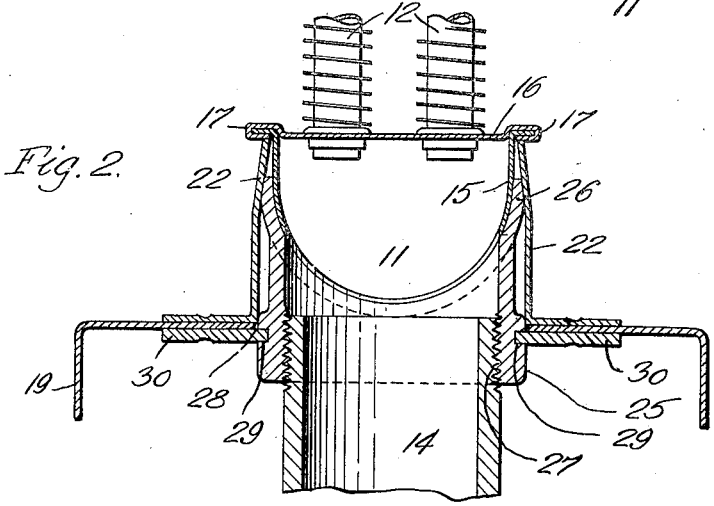
INVENTOR,
William J. Gamble
by Parker & Brockwood
ATTORNEYS.

Feb. 16, 1926.
W. J. GAMBLE
RADIATOR OR THE LIKE
Filed August 11, 1923  2 Sheets-Sheet 2
1,572,916
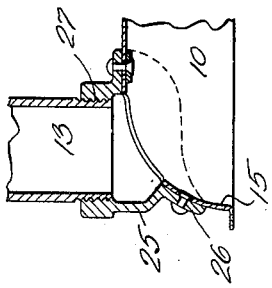
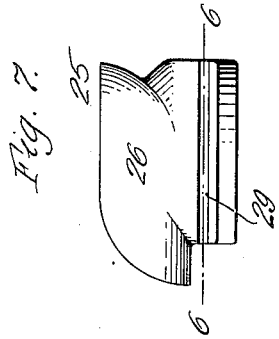
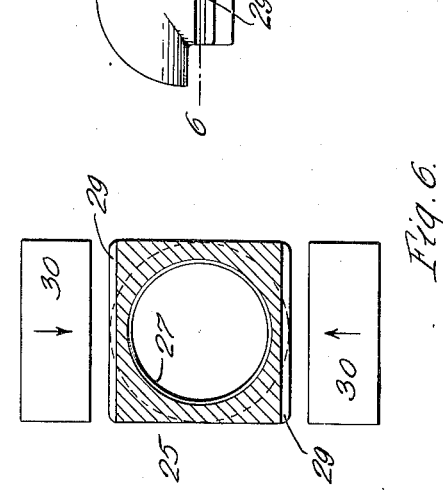
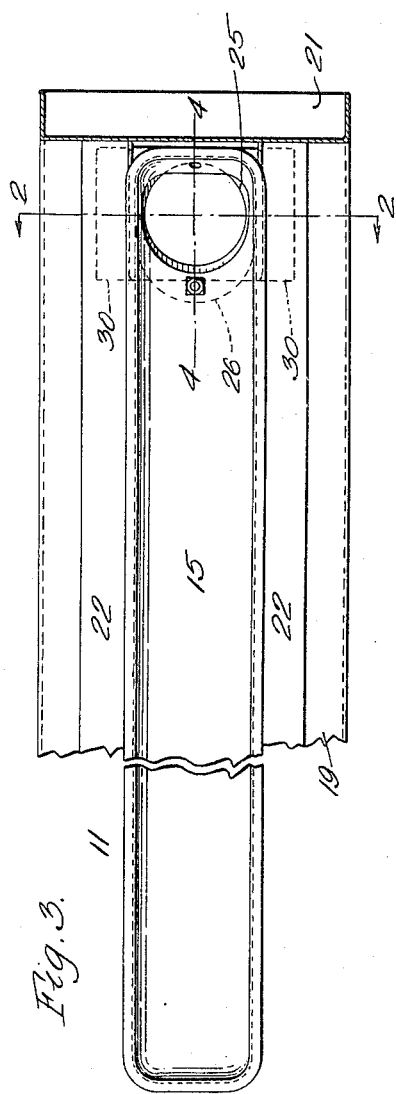
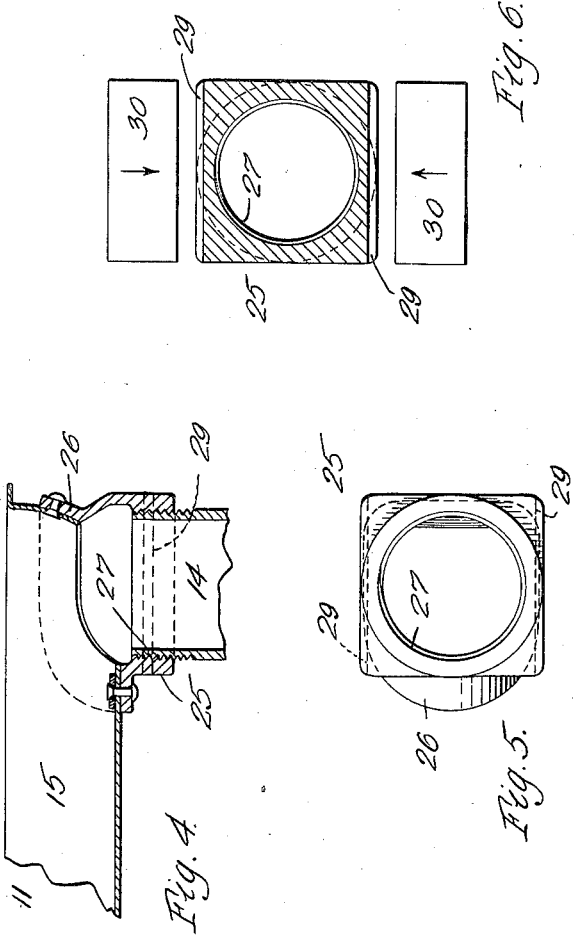
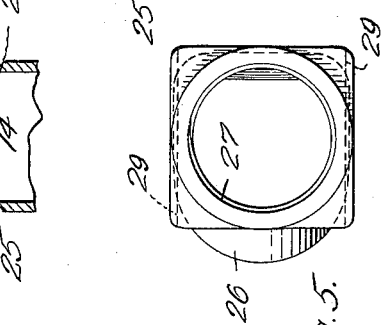
INVENTOR.
William J. Gamble
by Parker & Brochwow.
ATTORNEYS.

Patented Feb. 16, 1926.

1,572,916

UNITED STATES PATENT OFFICE.

WILLIAM J. GAMBLE, OF EAST ORANGE, NEW JERSEY, ASSIGNOR, BY MESNE ASSIGNMENTS, TO CARRIER CONSTRUCTION COMPANY, INC., OF NEWARK, NEW JERSEY.

RADIATOR OR THE LIKE.

Application filed August 11, 1923. Serial No. 656,897.

*To all whom it may concern:*

Be it known that I, WILLIAM J. GAMBLE, a citizen of the United States, residing at East Orange, in the county of Essex and State of New Jersey, have invented a new and useful Improvement in Radiators or the like, of which the following is a specification.

This invention relates more particularly to heaters or radiators of that kind which are constructed more or less wholly or in part only with thin walls made of metal of high conductivity and which are more or less flexible or frail and are not of sufficient strength or rigidity to withstand very great strains.

The principal object of my invention is to connect the fluid inlet or outlet pipe or pipes for such a radiator to the radiator and anchor the radiator to a protecting frame, support or structure in such a way that the strains or stresses on the pipe or pipes will be transmitted directly to the support, frame or structure, while the light, flexible wall or walls of the radiator will be relieved from such stress, whether due to the expansion and contraction of the pipes or to the strains incident to connecting the pipes with or disconnecting them from the radiator.

With this end in view, the radiator, in the preferred construction, is arranged within a frame which is adapted to support the radiator and protect it from injury by contact with objects, and the radiator is provided with one or more strong or rigid pipe fittings or members for connection with the pipes, which member or members is or are secured to the protecting frame in such a way as to be held against substantial movement relatively to the frame either in the direction of the length of the pipe or pipes or at an angle thereto so that any strain due either to endwise expansion or contraction of the pipe or pipes, or other movement thereof such as the screwing of the pipe into or out of the connection member or pipe fitting, will be transmitted directly to the protecting frame, and will not be communicated to the frail or flexible walls of the radiator, thereby preventing strain or injury to the latter.

In the accompanying drawings:

Fig. 1 is a fragmentary front elevation, partly in section, on a reduced scale, of a heater or radiator embodying my invention.

Fig. 2 is an enlarged transverse sectional elevation thereof, on line 2—2, Fig. 3, showing the manner of securing the pipe fitting or connection to the protecting frame.

Fig. 3 is a broken sectional plan view of a portion of the lower header of the radiator and the protecting frame.

Fig. 4 is a sectional elevation of the header and pipe fitting or connection on line 4—4, Fig. 3.

Fig. 5 is a bottom plan view of the pipe fitting detached.

Fig. 6 is a sectional plan view of the pipe fitting on line 6—6, Fig. 7, and showing the securing plates before attachment to the frame.

Fig. 7 is a side elevation of the pipe fitting.

Fig. 8 is a view similar to Fig. 4, showing the pipe fitting or connection for the upper header of the radiator.

A multiple unit radiator or heater is shown in Fig. 1 composed of a plurality of units or sections which can be combined in any desired number, but each of which forms a complete radiator and can be used alone, and is so considered herein. The radiator or unit as illustrated in the drawings comprises upper and lower headers 10 and 11, connected by spaced radiating tubes or elements 12 which are provided with helical fins or strips for increasing the radiating surface of the tubes, the headers and tubes being made of thin metal of high conductivity so that the walls of the headers are relatively flexible and adapted to readily expand and contract. 13 represents a supply or inlet pipe connecting with the upper header and 14 an outlet pipe connecting with the lower header, one pipe connected with each header being shown in the drawing. Each of the headers in the radiator shown consists of a trough shaped, pressed metal shell or body 15 and a tube plate 16 in which the radiating tubes are secured and which is joined at its edges to the edges of the shell 15 by a lock seam joint 17 extending around the header. This is a practical and desirable construction for a header composed of thin or flexible sheet metal, but in so far as this invention is concerned, the header could be of any other suitable construction. Furthermore, the invention is not restricted to the particular form or construction of the radiator herein shown and described, but is applicable to other forms of radiators whether provided with one or more headers or portions for the attachment of the pipe or pipes, and irrespective of whether there are one, two or more pipes connected with each header. The radiator can be supplied with steam or other heating medium and used for heating air which is caused to pass through the spaces between the tubes, or can be used for other heating or cooling purposes.

The radiator is supported and protected in a suitable structure or frame, which in the construction shown consists of top and bottom channel-shaped metal bars 18 and 19 connected by similar upright end bars 20 and 21 which are rigidly connected to the top and bottom bars by welding, riveting or in any other suitable manner to form a rigid frame. The frame is also provided with angle bars 22 which are secured to the bottom frame bar 19 at opposite sides of the lower header and on the upper edges of the upright legs of which the flanges formed by the lock seam joint of the header are adapted to rest, as indicated in Fig. 2. Similar angle bars 23 are provided at the opposite sides of the upper header and are adapted to engage the lock seam flanges of this header. While this construction of the frame is preferably employed, and is therefore shown in the drawings, the protecting frame or structure could be of other suitable construction.

25 represents a pipe fitting or member by means of which each of the inlet or outlet pipes for the radiator is connected to the radiator. This pipe fitting is provided with an inner flanged or saddle portion 26 shaped to closely fit the contour of that portion of the radiator with which it engages, and is securely attached to the radiator, and the fitting is provided at its outer portion with an internal screw thread 27, or is otherwise suitably fashioned for the connection therewith of the inlet or outlet pipe of the radiator. This fitting 25 is of strong and rigid construction adapted to withstand severe strains. For instance, the fitting can be a steel or other casting. Preferably, the radiator header and the pipe fitting 25 are welded together, the header being preferably made of Monel metal which can be welded to cast steel, but if necessary, the fitting can be riveted to the header and the joint soldered or brazed, or the parts rigidly connected in any suitable way which will provide a fluid-tight joint and strong connection. In the preferred construction shown, the pipe fitting 25 extends from the header or part to which it is attached through an opening in the adjacent bar or portion of the protecting frame, and the portion of the fitting located in the opening is made of square or other non-circular form so that the fitting can be held from twisting or turning relatively to the frame by engagement of the sides of the fitting with the frame or rigid parts thereon. The fitting is also formed so as to interlock with or engage the frame, or parts thereon, so as to prevent movement of the fitting relatively to the frame in a direction endwise of the pipe which is connected to the fitting. As shown in the drawings, the outer end portion of the fitting 25 is square and extends through a square opening 28 in the frame bar 19 and the opposite sides of this square portion of the fitting are formed with recesses or grooves 29 into which project plates 30 which are secured to the frame bar 19. The opening 28 in the frame bar is preferably made somewhat larger than the square portion of the pipe fitting so as to enable the radiator to be readily fitted or placed in the frame irrespective of possible discrepancies in the form and dimensions of the radiator and frame. After the pipe fittings of the radiator have been placed in the openings 28 in the frame, the securing plates 30 are placed in position with their inner edges engaging in the grooves 29 in the pipe fittings, and the plates are then rigidly secured by welding, riveting or in any other suitable manner to the protecting frame. When the pipe fittings have been thus secured to the frame, the engagement of the securing plates 30 in the grooves of the pipe fittings prevents movement of the fittings in the openings of the frame, in a direction lengthwise of the connected pipes, and the engagement of the plates with the opposite flat sides of the fittings also prevent any lateral or turning movement of the fittings in the frame. Therefore, any movement of the pipe fittings due to expansion or contraction of the pipes or to the screwing of the pipes into or out of the fittings will be transmitted directly to the frame, which will take the strain and will relieve the headers or attached portions of the radiator from this strain, and the radiator cannot be injured or the joints between the same and the pipe fittings weakened or injured by any strain or stress on the pipes.

I claim as my invention:

1. The combination with a radiator having a flexible wall, of a pipe fitting attached to said wall and adapted for the connection of a pipe therewith, and a protecting member for said radiator, said protecting member having provision for securing said pipe fitting against movement in one or more directions relatively to said member and thereby relieving said flexible wall from strain.

2. The combination with a radiator having radiating elements and a flexible header therefor, of a pipe fitting attached to said header and adapted for the connection of a pipe therewith, and a protecting member for said radiator, said protecting member having provision for securing said pipe fitting against movement in one or more directions relatively to said member and thereby relieving said flexible wall from strain.

3. The combination with a radiator having a flexible wall, of a pipe fitting attached to said wall and adapted for the connection of a pipe therewith, and a protecting frame for said radiator, said frame having provisions for securing said pipe fitting against movement in one or more directions relatively to said frame.

4. The combination with a radiator having a flexible wall, of a pipe fitting attached to said wall and adapted for the connection of a pipe therewith, a protecting member for said radiator, and a connection between said pipe fitting and said member for securing said pipe fitting against movement relatively to said member both axially and rotatably relative to the axis of the pipe.

5. The combination with a radiator having flexible headers connected by radiating elements, of pipe fittings attached to said headers and adapted for the connection of pipes therewith, a protecting frame for said radiator, and connections between each of said pipe fittings and said frame for securing said pipe fittings against movement in one or more directions relatively to said frame.

6. The combination with a radiator having a flexible wall, of a pipe fitting attached to said wall and adapted for the connection of a pipe therewith, a protecting frame for said radiator, and a device secured to said frame and engaging said pipe fitting and holding the latter against axial and turning movements relatively to said frame.

7. The combination with a radiator having a flexible wall, of a pipe fitting attached to said wall and adapted for the connection of a pipe therewith, a protecting frame for said radiator, said pipe fitting having a recess therein, and a device secured to said frame and projecting into said recess to hold said pipe fitting against movement in one or more directions relatively to said frame.

8. The combination with a radiator having a flexible wall, of a pipe fitting attached to said wall and adapted for the connection of a pipe therewith, a protecting frame for said radiator, said pipe fitting having a portion with non-circular recessed sides loosely entering an opening in said frame, and members projecting into said recessed sides and adapted to be stationarily secured to said frame for holding said pipe fitting against movement in one or more directions relatively to said frame.

WILLIAM J. GAMBLE.